United States Patent Office 3,205,221
Patented Sept. 7, 1965

3,205,221
2-AMINO-7-HALO-3H-NAPHTH(d)AZEPINE COMPOUNDS AND THEIR PREPARATION
Francis Johnson, Newton Lower Falls, and Wilmonte A. Nasutavicus, Framingham, Mass., assignors to The Dow Chemical Company, Midland, Mich., a corporation of Delaware
No Drawing. Filed Mar. 19, 1963, Ser. No. 266,195
18 Claims. (Cl. 260—239)

The present invention relates to novel naphthazepine compounds.

It is an object of this invention to provide novel naphthazepine compounds and a process for preparing said compounds.

We discovered that novel 2-amino-7-halo-3H-naphth-(d)-azepines are produced by reacting a 2,3-di(cyanomethyl)naphthalene with a dry halogen acid. The preparation is schematically illustrated for the naphth-(1,2-d)azepines and for the naphth(2,3-d)azepines, as follows:

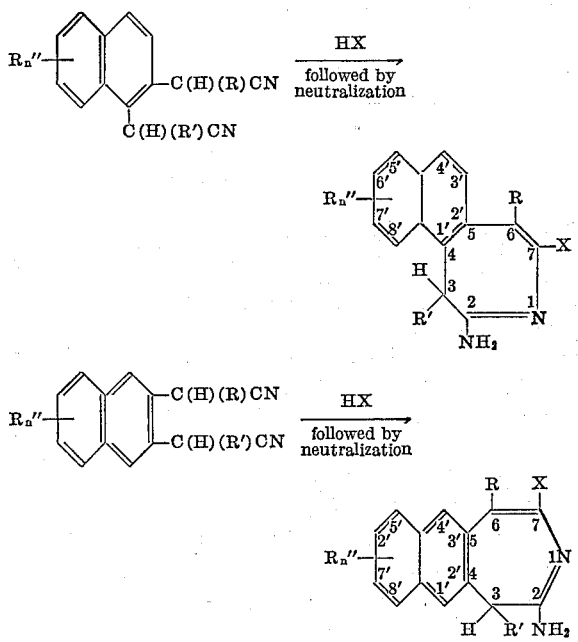

The compounds first produced during the reaction are the hydrohalide salts in which the hydrohalide (HX) is bonded to the ring nitrogen atom. The free bases hereinbefore noted are produced from the salt by neutralization in an aqueous mineral acid or base.

R and R' are preferably hydrogen, they may also be loweralkyl or monocyclicaryl.

The reactant dicyanomethyl naphthalene and the corresponding product may contain one or more additional substituents on the naphthalene nucleus at the 3' and 4' positions or 1' and 4' positions respectively, as well as the 5', 6', 7' and 8' positions (collectively represented by R″). $n$ is one to four and preferably one or two. The possible substituents on the naphthalene nucleus available are those known to the art. To avoid undesirable side reactions, they should not react with the hydrogen halide and/or solvent and/or product in the instant reaction mixture. Such substituents include the following groups: alkyl, nitro, oxo, dialkylamine, sulfonate, alkoxy, carboxyl, trifluoromethyl, halo, etc. The preferred azepines are those which are not substituted or which contain halo, loweralkyl, loweralkoxy, halo, carboxyl, or ester substituents. When there is only one substituent on the reactant di(cyanomethyl)naphthalene, two unsymmetrical products result because the cyclization would take place in both directions, as illustrated hereinafter:

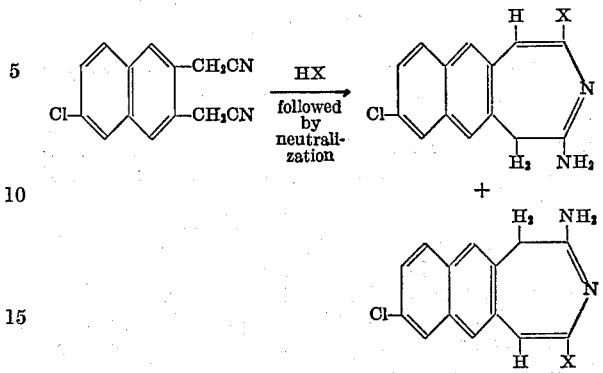

The cyclization is carried out by the reaction of the di(cyanomethyl)naphthalene with a dry halogen acid, such as, hydrogen chloride, hydrogen bromide, or hydrogen iodide. The reaction is carried out in an inert solvent which may be polar or non-polar and includes acetic acid, propionic acid, ethers generally, methylene chloride, chloroform, benezene, etc. The preferred solvents are acetic acid, ether, benzene or methylene chloride. The cyclization is preferably carried out using two or more equivalents of the halogen acid. Less than two equivalents leads to incomplete conversion. Halogen acid in excess of two equivalents has no adverse effects on the reaction. The reaction goes to completion quickly and is not materially affected by temperature or pressure. It is preferably carried out at ambient temperatures and pressures for convenience. Reaction time of up to two hours are preferred with the equipment utilized to date. The naphth(d)azepines are obtained from the reaction mixture and purified by known separating and purification techniques.

The 2-amino-7-halo-3H-naphth(d)azepines may be modified by standard techniques. The bromine substituted compound may have the bromine atom replaced with an iodine atom by reaction with sodium idoide in a solvent. One or both hydrogen atoms on the amine nitrogen atom may be replaced with alkyl groups, acyl groups, etc., by standard techniques.

For the purpose of further illustrating the invention to those skilled in the art, the following illustrative examples are given:

*Example I.—2-amino-7-bromo-3H-naphth(2',3'-d)azepine*

2,3-di(cyanomethyl)naphthalene (1 gm.) was treated at room temperature with hydrogen bromide in acetic acid (10 gms.; 30% HBr). The reaction mixture was agitated (stirred) for about two hours. The solid precipitate was removed by filtration and washed with acetic acid and ether to obtain the hydrobromide salt of the title compound. The product was then stirred with a saturated solution of sodium hydrogen carbonate and the solid recovered by filtration; and then washed with water and dried. The product, recrystallized from dimethylformamide, gave the pure title compound (1.1 g.) M.P. 240–242° C.

Found: C, 58.6%; H, 4.0%; Br, 27.6%, N, 9.5%. Required for $C_{14}H_{11}N_2Br$: C, 58.6%; H, 3.9%; Br. 27.8%; N. 9.8%.

*Example II.—2-amino-7-iodo-3H naphth(2'3'-d)azepine*

Treatment of 2,3-di(cyanomethyl)naphthalene (1.0 g.) with a 13% solution of hydrogen iodide in acetic acid (20 g.) in accordance with the procedure of Example I, led to a hydrogen iodide salt. Neutralization of this afforded the title compound (1.2 g.) M.P. 240–242° C.

Found: C, 50.3%; H, 3.5%; I, 38.2%; N, 8.2%. Required for $C_{12}H_{11}N_2I$: C, 50.3%; H, 3.3%; I, 38.0%; N, 8.4%.

*Example III.—2-amino-7-bromo-3H-naphth(1'2'-d)azepine*

1,2-di(cyanomethyl)naphthalene (0.5 g.) was treated with hydrogen bromide in acetic acid (5 g.; 30% HBr) in accordance with the procedure of Example I. The solid precipitate was neutralized with base and the residue recrystallized from ethanol to give the title compound M.P. 232–236° C.

Found: C, 58.7%; H, 3.9%; N, 9.6%. Required for $C_{14}H_{11}N_2Br$: C, 58.6%, H, 3.9%, N, 9.8%.

The use of HCl in place of the other compounds yield the corresponding chlorine substituted product.

The following substituted 2-amino-7-halo-3H-naphth-(d)azepines are produced by using the corresponding substituted 2,3-di(cyanomethyl)naphthalenes in place of the unsubstituted material as the reactant, and following the procedure of the examples.

2 - amino-7-chloro-3H-6',7'-dimethoxynaphth(2'3 - d) azepine.
2 - amino-7-bromo-3H-5',8'-dimethoxynaphth(1',2' - d) azepine.
2 - amino-7-bromo-3H-6'7'-dichloronaphth(2',3' - d)azepine.
2 - amino-7-bromo-3H-5',8'-dibromonaphth(2'3' - d)azepine.
2 - amino-7-bromo-3H-6',7'-dicarboxynaphth(1',2' - d) azepine.
2 - amino-7-bromo-3H-6',7'-dimethylnaphth(2'3' - d)azepine.
2 - amino-7-bromo-3H-6',7'-diethylnaphth(2'3' - d)azepine.
2 - amino-7-bromo-3H-6',7' - methyenedioxynaphth(2',3'-d)azepine.
2 - amino-7-bromo-3H-5',6',7',8', - tetrachloronaphth-(2',3',-d)azepine.
2 - amino-3,6-dimethyl-7-bromo-3H-naphth(1'2' - d)azepine.
2 - amino-3,6-diphenyl-7-bromo-3H-naphth(2',3' - d)azepine.

2-amino-7-halo-3H-naphth(d)azepines are useful as cockroach poisons.

As many embodiments of this invention may be made wihtout departing from the spirit and scope thereof, it is to understood that the invention includes all such modifications and variations as come within the scope of the appended claims.

Reference is made to our patent application Serial No. 266,205 directed to 2-amino-7-halo-3H-benz(d)azepines, filed of even date herewith, which is made a part hereof.

What is claimed is:
1. The process of preparing 2 - amino-7-halo - 3H-naphth(d)azepines comprising reacting a dicyanomethyl naphthalene selected from the group consisting of 1,2-di(cyanomethyl) naphthalene and 2,3-di(cyanomethyl) naphthalene, with hydrogen halide in an inert solvent to form the hydrohalide salt and then neutralizing to form the free amine.
2. The process of claim 1 wherein the hydrogen halide is at least twice the stoichiometric amount.
3. The process of claim 1 wherein the solvent is selected from the group consisting of acetic acid, ether, benzene, and methylene chloride.
4. A compound of the formula

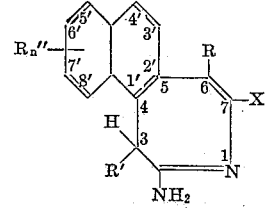

wherein
n is a whole number from 1 to 4;
R and R' are selected from the group consisting of hydrogen, loweralkyl and phenyl;
R" is selected from the group consisting of loweralkyl, loweralkoxy, halo, and carboxyl groups; and
X is selected from the group consisting of bromine, iodine, and chlorine.
5. A compound of the formula

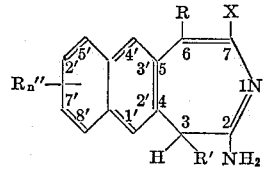

wherein
n is a whole number from 1 to 4;
R and R' are selected from the group consisting of hydrogen, loweralkyl and phenyl;
R" is selected from the group consisting of loweralkyl, loweralkoxy, halo, and carboxyl groups; and
X is selected from the group consisting of bromine, iodine and chlorine.
6. The hydrohalide salts of the compounds of claim 4.
7. The hydrohalide salts of the compounds of claim 5.
8. 2-amino-7-bromo-3H-naphth(1',2'-d)azepine.
9. 2-amino-7-iodo-3H-naphth(1',2'-d)azepine.
10. 2-amino-7-chloro-3H-naphth(1',2'-d)azepine.
11. 2-amino-7-bromo-3H-naphth(2',3'-d)azepine.
12. 2-amino-7-iodo-3H-naphth(2',3'-d)azepine.
13. 2-amino-7-chloro-3H-naphth(2',3'-d)azepine.
14. 2 - amino-7-chloro-3H-6',7' - dimethoxynaphth-(2',3'-d)azepine.
15. 2 - amino-7-bromo - 3H - 5',8' - dimethoxynaphth-(1',2'-d)azepine.
16. 2 - amino-7-bromo-3H-6',7' - dichloronaphth(2',3'-d)azepine.
17. 2 - amino-7-bromo-3H-5',8' - dibromonaphth(2',3'-d)azepine.
18. 2 - amino - 7 - bromo-3H-6',7' - dicarboxynaphth-(1',2'-d)azepine.

No references cited.

NICHOLAS S. RIZZO, *Primary Examiner.*